Patented Apr. 18, 1933

1,904,595

UNITED STATES PATENT OFFICE

LESTER V. ADAMS, OF SCHENECTADY, NEW YORK, ASSIGNOR TO GENERAL ELECTRIC COMPANY, A CORPORATION OF NEW YORK

RESINOUS COMPOSITION

No Drawing.  Application filed October 27, 1928. Serial No. 315,591.

The present invention relates to resinous condensation products, and comprises a new type of resin, one of the ingredients of which is a substance of the terpene class. As a consequence of my invention resinous compositions of improved chemical and physical properties have been provided.

In accordance with my invention resinous bodies are prepared by causing certain members of the terpene class to combine with substances containing an acid radical. The terpene may be associated with other substances capable by themselves of forming resinous condensation products, for example, a polyhydric alcohol associated with a terpene may be caused to react with a polybasic acid (or its anhydride) to produce a resin.

The novel aspects of my invention will be pointed out in the accompanying claims and will be better understood by reference to the following specific examples:

Resins of the polyhydric alcohol-polybasic acid class, also known as alkyd resins, to advantage may be modified by replacing part of the polyhydric alcohol with a terpene thereby producing resins having new and advantageous properties. For example, the alkyd resin made from glycerine and phthalic anhydride, as described in United States Letters Patent to Callahan, 1,108,330 of August 25, 1914, is slowly attacked by water so that the resin becomes white and crumbly when exposed to water for prolonged periods. When such a resin is made by associating a terpene containing hydroxyl groups with the reacting ingredients water resistance and other important properties are imparted to the alkyd resin. The resulting resin is more resistant to water than a resin into which rosin has been incorporated.

The terpene compound may be added to the polyhydric alcohol and polybasic acid during the reaction period or the terpene may be caused to react with the alkyd resin while the resin is in the fusible, soluble condition.

In the same manner a clear dark red resin may be made by reaction between 24.3 parts phthalic anhydride, 5 parts white turpentine gum, and 10 parts glycerine at 200° C. This resin has been found to be completely water resistant even when exposed to escaping steam in a tight enclosure for a number of weeks.

A hard, inert resin may be made by causing resinification to occur by heating in the usual well understood manner between 24.3 parts of phthalic anhydride, 10 parts borneol and 5 parts of glycerine. This is a dark-red resin which quickly reaches the B-stage on heating at 150° C. more rapidly than without the addition of borneol.

A reddish-brown, tough, water resistant resin may be prepared by the interaction of 3 parts of phthalic anhydride, 2 parts of terpene hydrate and 1 part glycerine. The first two ingredients may be caused to react separately at 240° C. and the glycerine then may be added to cause a second reaction to take place. Upon continued heating a fusible, soluble resin is formed which is convertible.

Oil of cedar wood consists of a liquid terpene and a solid compound having the properties of a tertiary alcohol. Such an oil may be blended with phthalic anhydride and glycerine to form a resin of desired properties. Oil of cedar is but one of a large number of oils that may be used in this way.

A reaction can be caused to occur by using a terpene compound, such as turpentine, as a suspending medium for the alkyd resin in the A- or B-stage, or a mixture of resins in those two stages. An alkyd resin, such as a composition of phthalic anhydride and glycerine, is insoluble in turpentine but may be suspended therein in a finely divided condition. When applied as a coating material for metal, wood, glass or other surfaces, by spraying, painting, or otherwise, some of the turpentine evaporates, but it is found that the resin, especially upon baking, has changed in color and become more water resistant by chemical reaction with the turpentine.

My invention is applicable not only to resins containing solely a polybasic acid but also to resins in which the polybasic acid has been replaced by resins having a monobasic acid such as oleic acid or one of the acids derived from a drying oil.

The resins containing terpene may also be blended or compounded with any of the various materials now used in an admixture with alkyd resin as for example cellulose compositions, natural or artificial gums, oils, dyes, etc. My improved resins may be used as coating materials, cementing materials and as binders for making molded materials. They have particular value for coating devices such as the interior and exterior of refrigerators or other containers which are continuously subject to moisture during use.

What I claim as new and desire to secure by Letters Patent of the United States is:

1. A resinous composition comprising the composition formed by the simultaneous condensation of glycerine, phthalic anhydride and a terpene containing hydroxyl groups.

2. A resinous composition comprising the combination of an alkyd resin and a terpene containing hydroxyl groups.

3. A resinous composition comprising the product of reaction of a polyhydric alcohol, a polybasic organic acid and a terpene containing hydroxyl groups.

In witness whereof, I have hereunto set my hand this 26th day of October, 1928.

LESTER V. ADAMS.